(12) United States Patent
Raj et al.

(10) Patent No.: US 12,463,743 B2
(45) Date of Patent: Nov. 4, 2025

(54) MULTI-LAYER FORWARD ERROR CORRECTION (FEC) FOR JAMMING RESILIENCY

(71) Applicant: MITRE Corporation, Bedford, MA (US)

(72) Inventors: Alex E. Raj, Bedford, MA (US); Wade E. Daugherty, Bedford, MA (US); Lucas Lam, Bedford, MA (US)

(73) Assignee: Mitre Corporation, Bedford, MA (US)

( * ) Notice: Subject to any disclaimer, the term of this patent is extended or adjusted under 35 U.S.C. 154(b) by 397 days.

(21) Appl. No.: 18/131,203

(22) Filed: Apr. 5, 2023

(65) Prior Publication Data
US 2025/0286651 A1   Sep. 11, 2025

Related U.S. Application Data

(60) Provisional application No. 63/327,615, filed on Apr. 5, 2022.

(51) Int. Cl.
*H04L 1/00* (2006.01)

(52) U.S. Cl.
CPC ............ *H04L 1/0042* (2013.01); *H04L 1/004* (2013.01)

(58) Field of Classification Search
CPC .................................................... H04L 1/0042
See application file for complete search history.

(56) References Cited

U.S. PATENT DOCUMENTS

| | | | |
|---|---|---|---|
| 5,259,030 A * | 11/1993 | Francis | H04K 3/25 375/150 |
| 2018/0191457 A1* | 7/2018 | Wang | H04B 1/0028 |
| 2019/0013892 A1* | 1/2019 | Chen | H04B 7/18513 |

\* cited by examiner

*Primary Examiner* — Joseph D Torres
(74) *Attorney, Agent, or Firm* — Jones Day

(57) ABSTRACT

Interference signals are detected in a multi-layer wireless communication systems, which have a frequency spectrum that is captured by using a spectrum analyzer. Thereafter, an occurring interference type is identified based on image of the frequency spectrum. In response, an interference mitigation solution is engaged which corresponds to the identified interference type. The interference mitigation solution can simultaneously deploy or change one or more forward error correction (FEC) protocols on each of two or more of the layers along with other related system parameters. Related apparatus, systems, techniques and articles are also described.

22 Claims, 13 Drawing Sheets

MULTI-LAYER FORWARD ERROR CORRECTION (FEC) FOR JAMMING RESILIENCY

CROSS REFERENCE TO RELATED APPLICATIONS

This application claims the benefit of priority from U.S. Provisional Application No. 63/327,615, filed Apr. 5, 2022. The foregoing related application, in its entirety, is incorporated herein by reference.

GOVERNMENT LICENSE RIGHTS

This invention was made with government support under Federal Contract Award No. FA870217C0001 (Category No. 541990) awarded by the U.S. Department of Defense, specifically the United States Air Force through Hanscom Air Force Base. The government has certain rights in the invention.

TECHNICAL FIELD

The subject matter described herein relates to techniques for mitigating signal jamming or other interference on multiple layers.

BACKGROUND

Internet and Intranet transmit and receive data communication requires bit error rate (BER) less than $10^{-8}$. Communication systems use multi-layer protocols including the Open Systems Interconnection (OSI) layer transmit and receive data model to communicate with amongst peers. Each layer uses layer specific header information to identify and recover errors in the transmit and receive data communication.

Jamming as well as other types of interference cause bit errors in various OSI layers used in the transmit and receive data communication. Jamming can cause concurrent bit errors at one or more OSI layers. The bit errors at a specific layer can cause transmit and receive data communication loss at that layer.

Current jamming related mitigation solutions focus on improving modulation and demodulation techniques, selecting channels and sub channels at different frequencies, spreading the frequency spectrum, and controlling transmit power to improve signal to noise ratio at the physical layer.

SUMMARY

In a first aspect, jamming and/or interference signals having a frequency spectrum are detected in a multi-layer communication system. Thereafter, based on an image of the frequency spectrum one or more interference types that are identified. For each jamming type and environment corresponding jamming performance characteristics or jamming data specifications can be created and published for various parameters such as Forward Error Correction (FEC) and stored as potential interference mitigation solutions. An interference mitigation solution is then engaged for the identified interference type as specified in the jamming specifications. The interference mitigation solution simultaneously deploys or changes a configuration of one or more forward error correction (FEC) on each of two or more of the layers.

A first of the two or more layers in which the interference mitigation solution is employed can be a network level layer. A second of the two or more layers in which the interference mitigation solution is employed can be a physical level layer. A third of the two or more layers in which the interference mitigation solution is employed can be an application level layer.

The identification of the interference or jamming type can be performed by at least one machine learning model using the frequency spectrum as an input. The at least one machine learning model can take different forms including a machine learning-based image classifier (e.g., convolutional neural network, etc.). The machine learning-based image classifier can be trained with each of a plurality of jamming specifications which characterize transmission and reception information and mitigation solutions.

The multi-layer communication system can take various forms including a wireless communication system. Example wireless communication systems can include one or more of a broadband cellular network, short-range wireless technologies, or a satellite communications network.

In an interrelated aspect, data is received that characterizes detected jamming and/or interference signals having a frequency spectrum in a multi-layer wireless communication system. Based on an image of the frequency spectrum, the type of interference is identified using at least one machine learning model. In response, an interference mitigation solution corresponding to the identified interference type is engaged. The interference mitigation solution simultaneously deploys or changes deployed one or more forward error correction (FEC) on each of two or more of the layers.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many advantages. For example, the current subject matter provides techniques for reduced bit error rate during interference events within a communication system such as jamming.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1A:
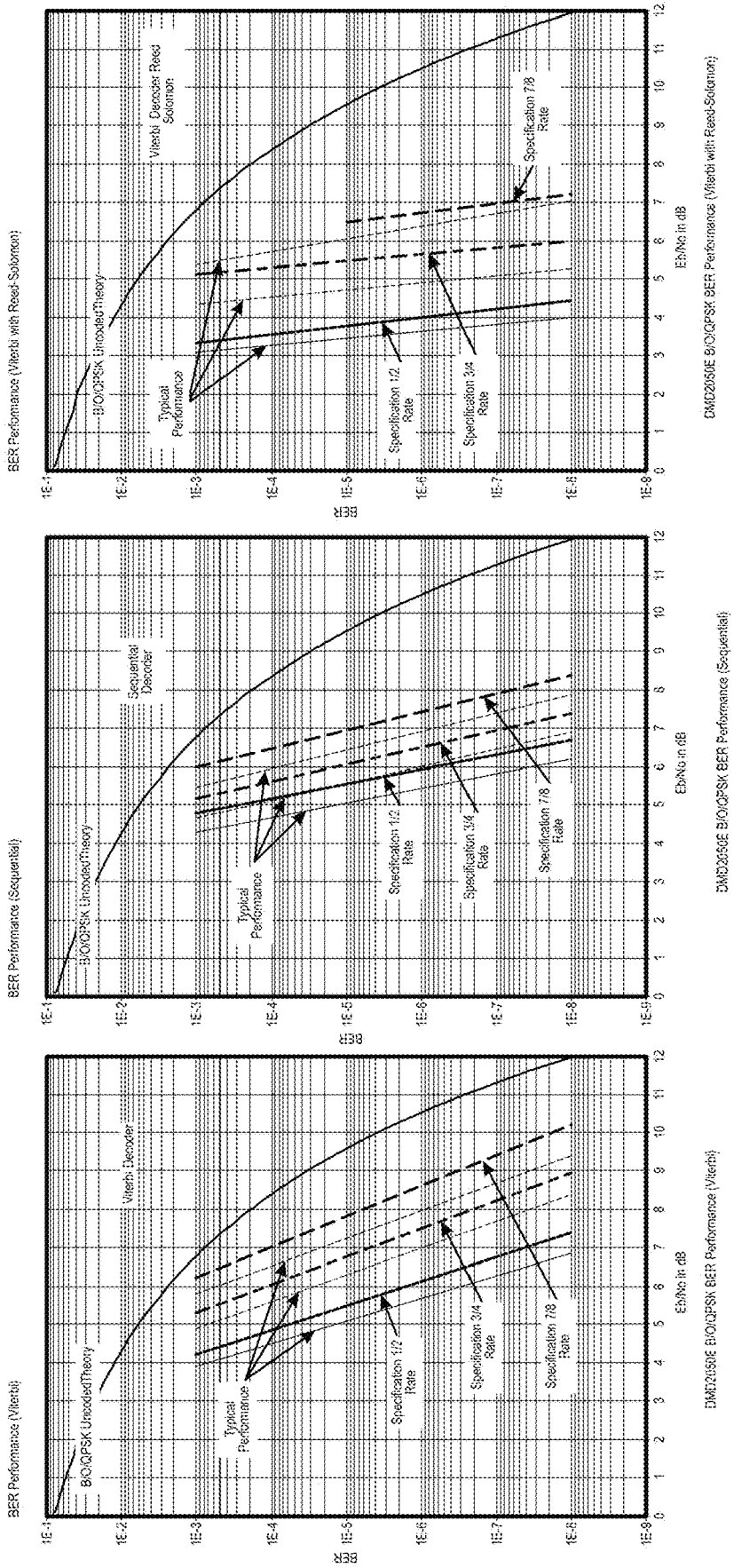
FIGS. 1A-1F are diagrams illustrating various modem FEC graphs for different modulations under varying conditions.
Figure 1B:
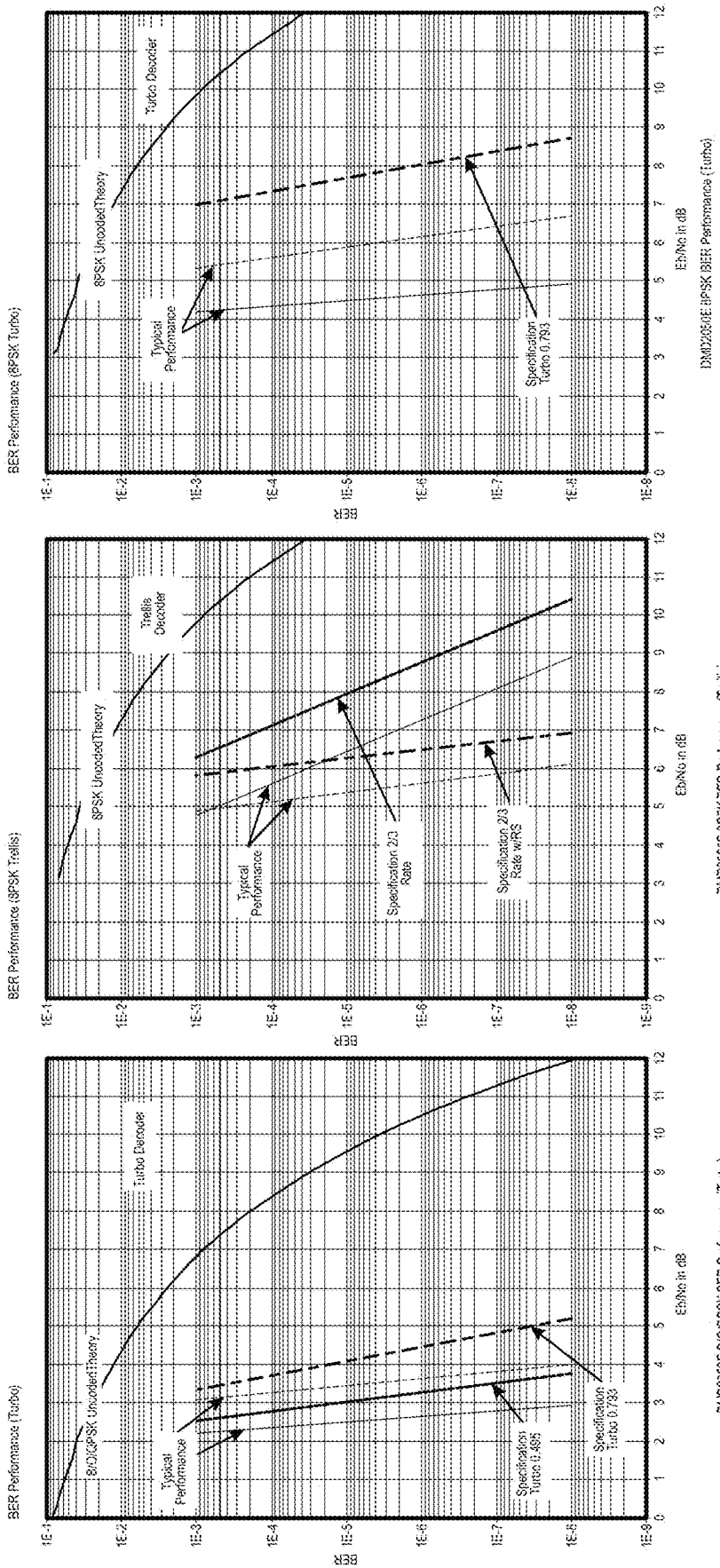
Figure 1C:
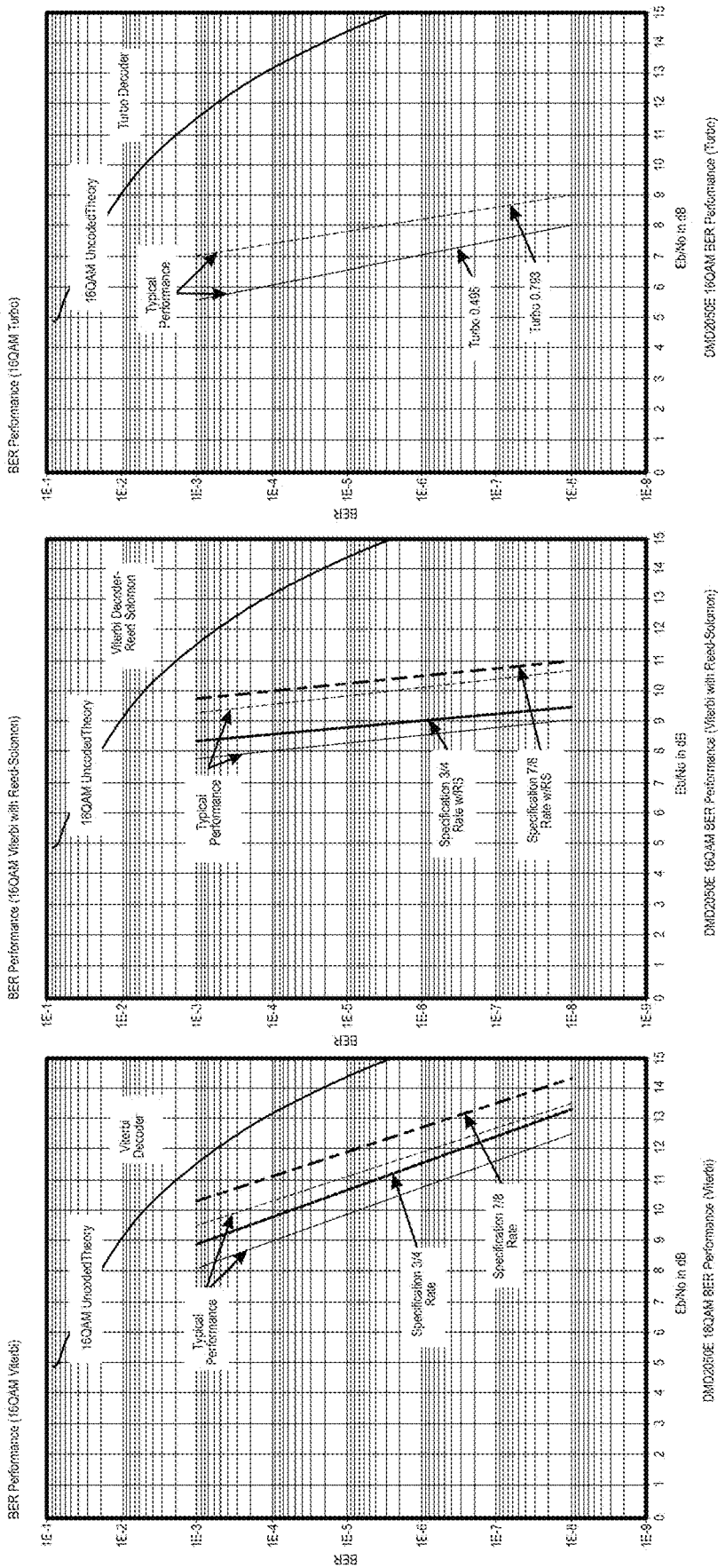
Figure 1D:
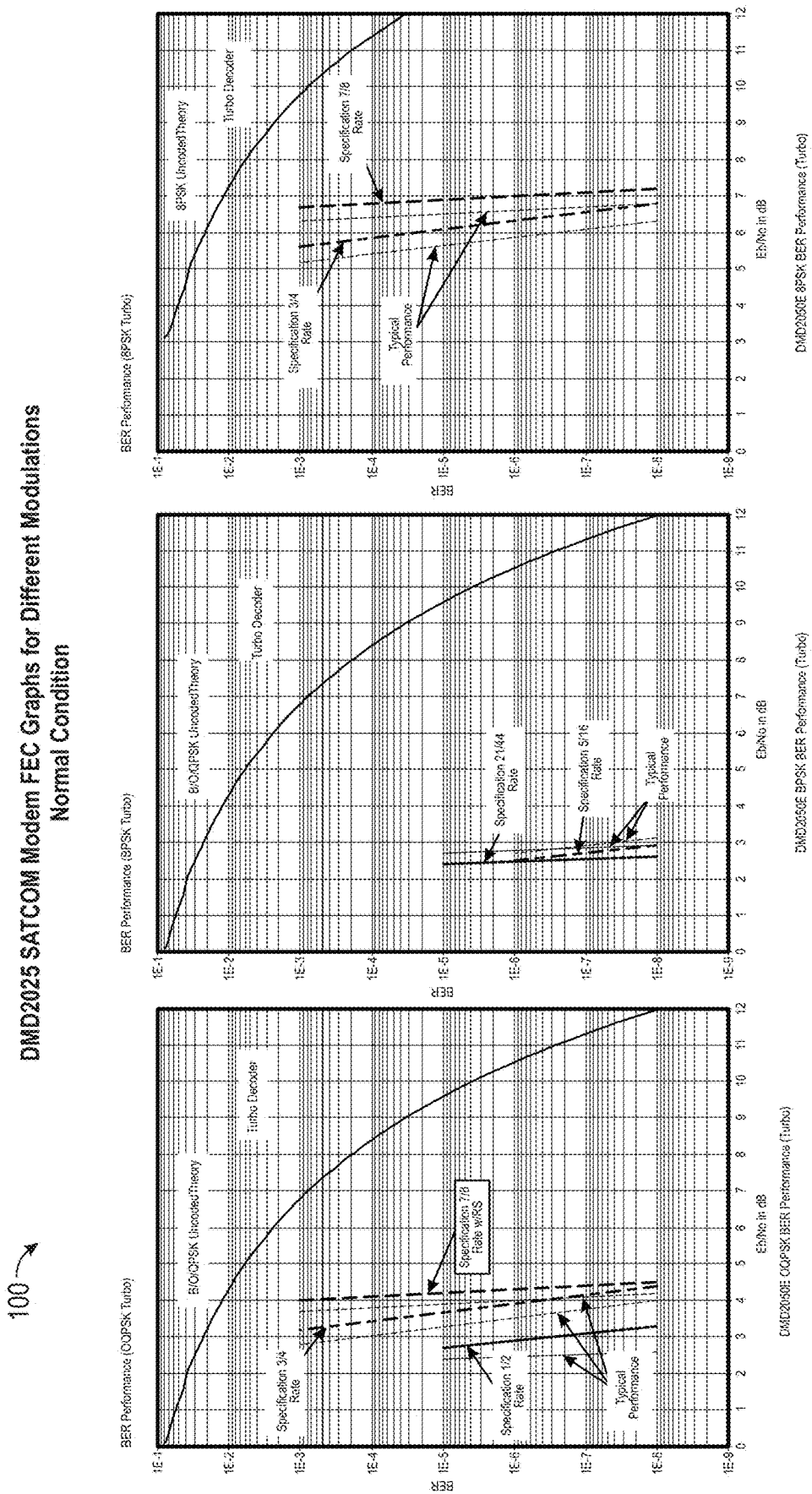
Figure 1E:
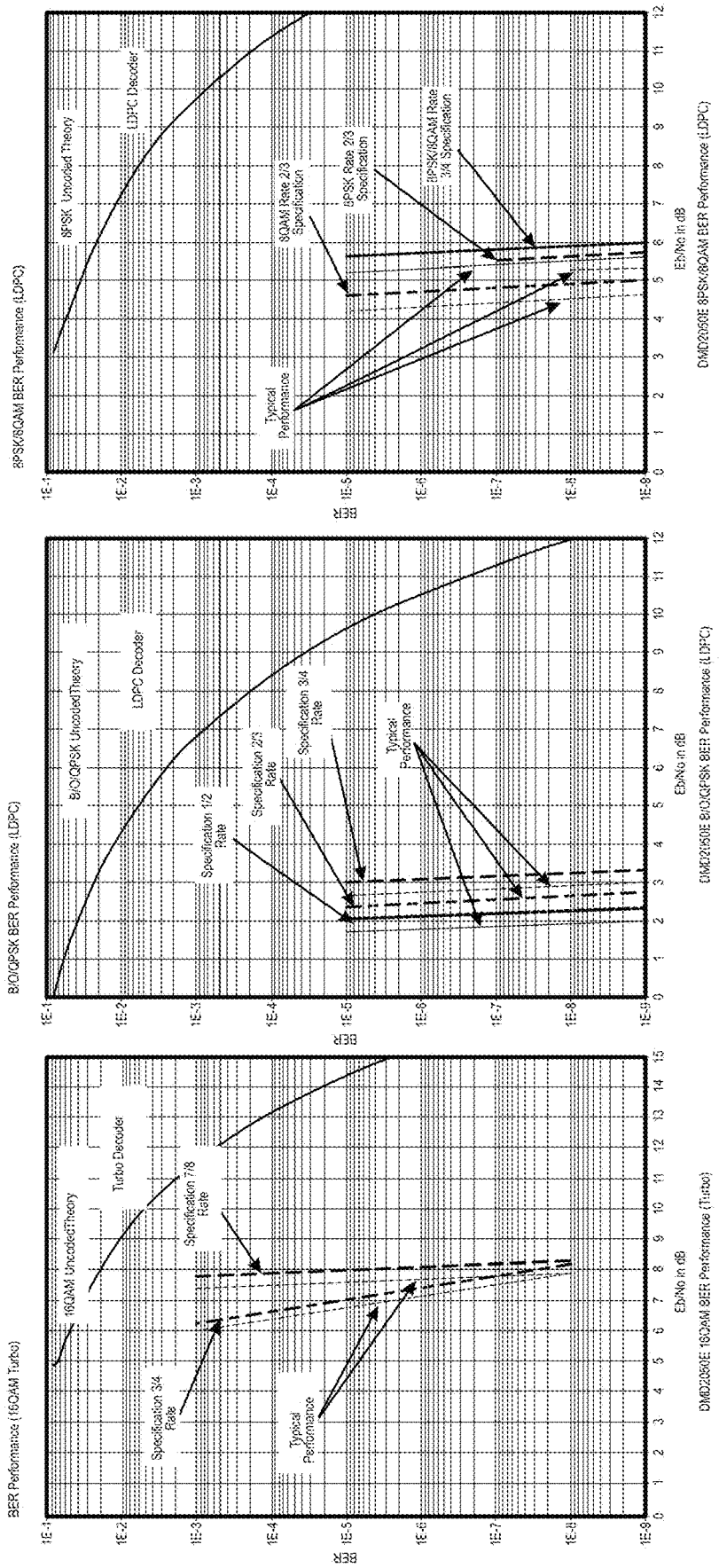
Figure 1F:
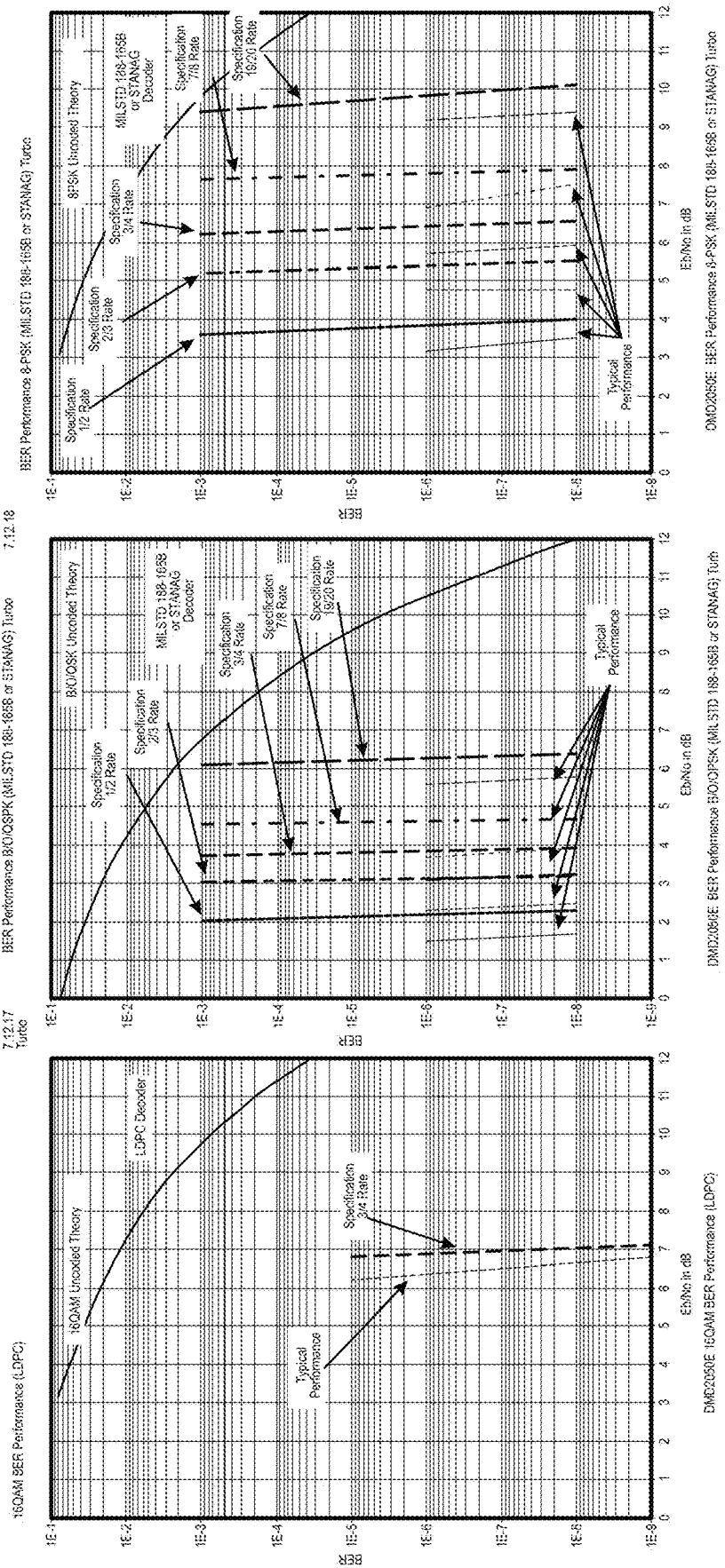

The current subject matter is directed to enhanced techniques for identifying and mitigating interference (including jamming) within a communication system. With some communication systems, a forward error correction (FEC) process can be used at the physical layer to reduce bit errors. At the physical layer, FEC can significantly reduce the bit error rate ("BER") (e.g., $10^{-2}$). As provided herein, multi-layer FEC helps in reducing the BER further (e.g., more than $10^{-4}$) and makes it possible to use FEC during jamming. For example, the communication system physical layer can employ differing FEC algorithms.

Different FEC algorithms and modulations as provided herein can have different BER performance for different jamming types, data types and system parameters (e.g., transmit power, carrier frequency, signal to noise ratio, and message lengths).

FEC is an error correction technique to detect and correct a limited number of errors in transmitted data without the need for retransmission. In this method, the sender sends a redundant error-correcting code along with the normal information. The receiver performs necessary checks based upon the additional redundant information. If the receiver finds that the data is free from errors, it executes error-correcting code that generates the actual information. The receiver then removes the redundant information before passing the message to upper layers within the wireless communication system.

Error correcting codes for forward error corrections can be broadly categorized into two types, namely, block codes and convolutional codes.

Block codes—The message is divided into fixed-sized blocks of bits to which redundant bits are added for error correction.

Convolutional codes—The message comprises data streams of arbitrary length and parity symbols which are generated by the sliding application of a Boolean function to the data stream.

There are four popularly used error correction codes.

Hamming Codes—It is a block code that can detect up to two simultaneous bit errors and correcting single-bit errors.

Binary Convolutional Code—With this code, an encoder processes an input sequence of bits of arbitrary length and generates a sequence of output bits.

Reed-Solomon Code—It is a block code that can correct burst errors in the received data block.

Low-Density Parity Check Code—It is a block code specified by a parity-check matrix containing a low density of is. These codes are suitable for large block sizes in very noisy channels.

Of note, FEC does not require handshaking between the source and the destination, so it can be used for broadcasting of data to many destinations simultaneously from a single source. FEC is also advantageous in that it can save bandwidth required for retransmission (and as a result, it is often used in real-time systems).

FIGS. 1A-1F are diagrams 100 that shows example graphs for layer 1, DMD2050 modem level FEC types and modulations. The DMD2050 modem specification provides 17 such graphs (BER and EbNo) for different modulation types in a normal condition. In order to generate these graphs, a user can choose any one of these 17 settings in addition to different FEC rates inside each graph in the normal condition for a specific modulation type and other modem parameter (e.g., modulation and demodulation type, FEC, signal strength (e.g., energy per bit (Eb), spectral noise density (No), fixed/moving, antenna position, antenna size, satellite antenna spatial separation, tracking, available power, modem output power, etc.) configurations. If there is a jamming situation, the jamming can change these graphs significantly. For example, during jamming, the BER increases, which changes the modem EbNo characteristics and its rate graphs. The BER depends on jamming type. Therefore, these graphs need to be generated for each jamming type.

Additionally, for each jamming type, the modem's jamming throughput and other communication specifications as provided herein can be used in selecting the interference mitigation solution.

First, the similar set of graphs need to be generated for each jamming type. As different jamming types require a different type of interference mitigation solution, the jamming type needs to be identified. In this case, the frequency spectrum can help identify the jamming type (using, for example, an image for the frequency spectrum and one or more machine learning-based image classifiers, etc.) and, as such, a mechanism can be included to capture the frequency spectrum.

Different modems have different FEC performance graphs for different modem parameters. The jamming slightly alters these BER and EbNo graphs. These altered jamming-related BER and EbNo graphs can be generated for each solution for each jamming type.

The system or system of system (SOS) may use batteries to power the system. With this arrangement, operational time and power usage time may need to be maximized along with anti-jamming. Further, power adjustment may be restricted with some satellite communication (SATCOM) providers.

Modems may use FEC in combination with different modulation techniques. In addition, anti-jamming solutions (AJS) sometimes referred to herein as interference mitigation solutions, can use different FEC rates, along with different modulation techniques and other modem parameters such as different frequency spectrums.

Depending on the particular communication system used, system constraints and particular jamming types may require higher layer FEC solutions. For example, Software-Defined Wide-Area Network (SD-WAN) ½ rate FEC can enable application specific FEC and duplication comparison to lower modem level ½ rate FEC which duplicates all traffic. As another example, SD-WAN can implement adaptive FEC mechanisms, which only uses FEC when there is a jamming as compared with primitive modem level always ON FEC mechanism. Appropriate multi-layer FEC types need to be provisioned to maximize the throughput and minimize the BER. The product and/or solution jamming specification for different combinations of solutions and jamming types as provided using the techniques herein can provide the right interference mitigation solution for a particular situation involving interference or jamming.

Further, the application layer FEC can be optimized in Wide-Area Networks (WANs). In this context, WAN optimization or acceleration uses byte caching, which significantly reduces data transfer. Given that there is reduced data transfer, the number of errors also decreases. Additional WAN optimization FEC on the application layer can be provide significant benefits regarding anti-jamming.

Given the disparate types of jamming being used, different anti-jamming solutions may need to be adopted. Anti-jamming data sheets and necessary mitigation information can be generated. These data sheets can characterize diverse information including frequency spectrum details, jamming related throughput performance for the product and or solutions, and/or different recommended solutions for evading different jamming types. The data sheets can be used as part of an anti-jamming data specification. Further, in some variations, artificial intelligence models (including machine learning models) can be generated to select which interference mitigation solution to apply at any given time based, for example, on a detected frequency spectrum. These artificial intelligence models can be trained, for example, using the anti-jamming data specifications.

Bit errors and packet loss coupled with latency significantly impacts application performance. As noted above, Forward Error Correction (FEC) can be used for correcting bit errors. At layer 1, systems such as SATCOM uses FEC for correcting layer 1 bit errors. At layer 3, Network level FEC technology can be adapted at the network layer to improve application performance across networks that have high-loss characteristics. With network level FEC, network equipment can reconstitute lost packets at the far end of a WAN link, avoiding delays that come with multiple round-trip retransmissions. At higher layers, FEC can significantly improve application performance (10 to 100-fold performance increase for some data types).

Some jamming types can introduces bit errors in all layers. Layer specific FEC significantly reduces bit errors at different OSI layers. As provided herein, multi-layer FEC enables networks to easily recover from packet loss due to a variety of network conditions including jamming (which in turn improve application performance). The current orchestrated multi-layer FEC mechanisms significantly improve application performance under jamming environments.

Figure 2:
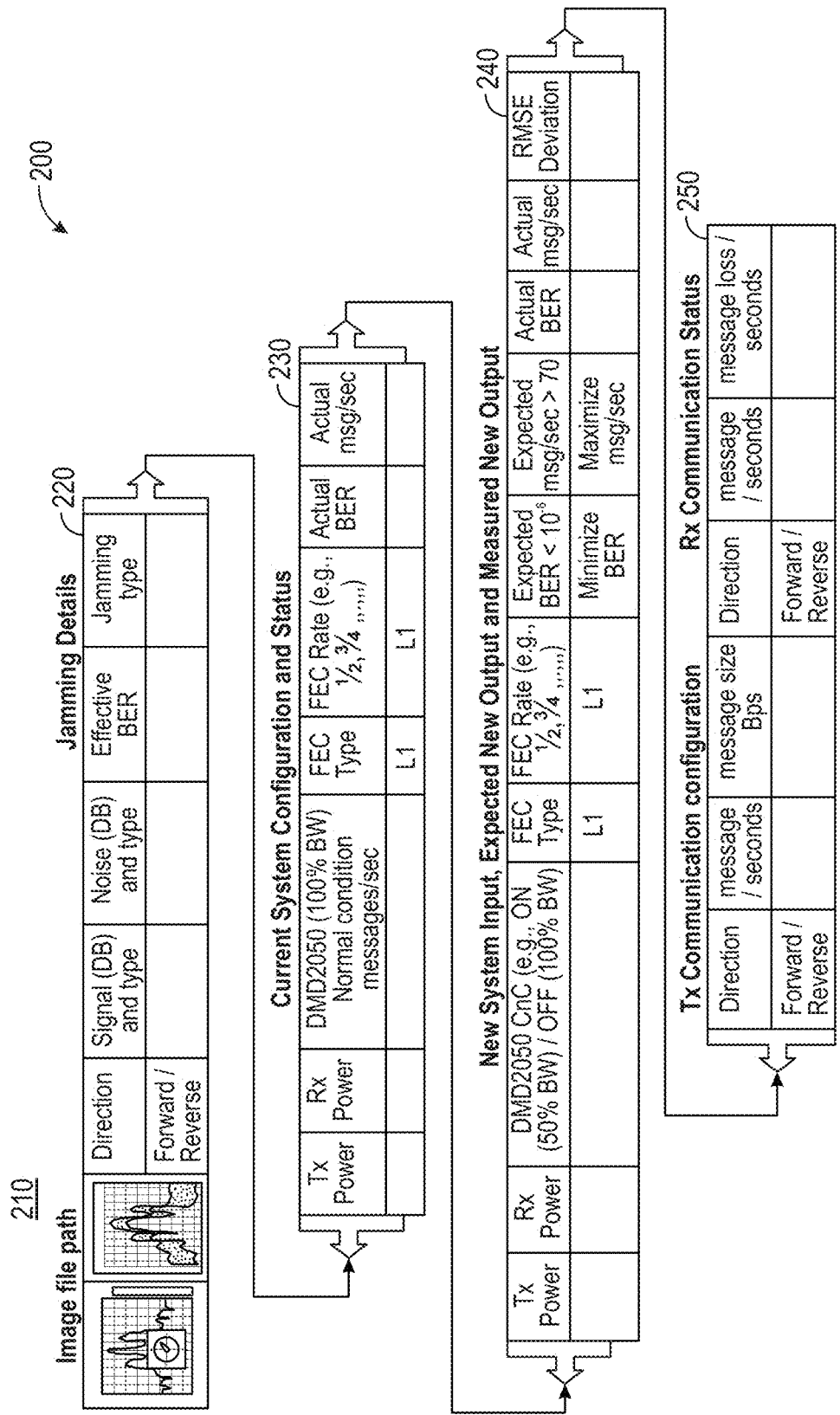
FIG. 2 is a diagram illustrating information associated with a multi-layer FEC specification.

FIG. 2 is a diagram illustrating various data that can be captured for each jamming type and which can be used to generate an anti-jamming data specification. The basis of such specification is an example image file path 210 which comprises the image of the frequency spectrum detected when the interfering/jamming condition is present. The specification can include jamming details 220 such as direction, signal intensity and type, noise intensity and type, effective BER, and jamming type. The specification can also include information about the current system configuration and status 230 such as transmission/reception power, carrier frequency, messages/second settings, FEC type (e.g., layer type), FEC rate, actual BER, and actual messages/second. The specification can also include new system input, expected new output, and measured new output information 240 such as transmission/reception power, messages/second settings, FEC type, FEC rate, expected BER, expected messages/second, actual BER, actual messages/second, and RMSE deviation. The specification information can also include transmission communication configuration and reception communication status 250 such as, on the transmission side, direction, messages/second, message size and, on the reception side, direction, messages/second, and message loss/seconds. Once the data is generated, necessary additional details such as modulation type and carrier frequency details can also be added for each data set.

Figure 3:
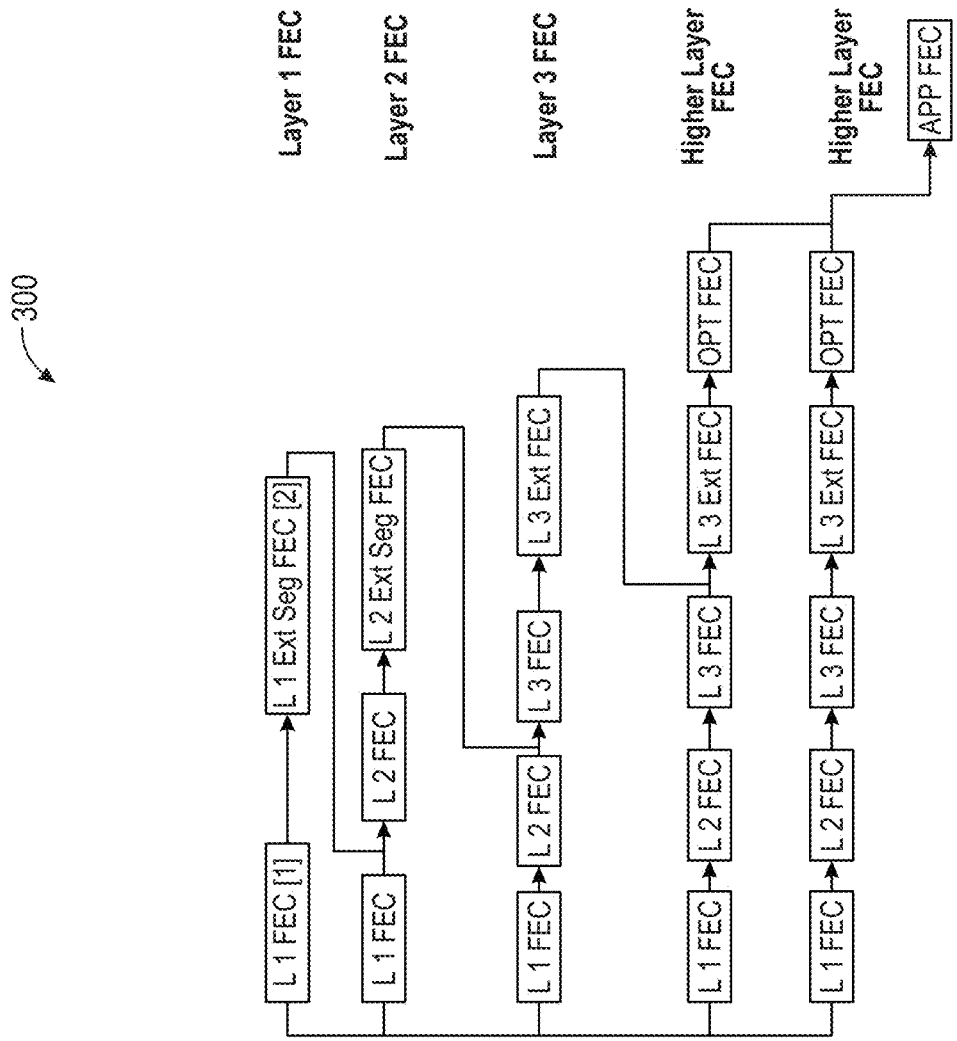
FIG. 3 is a diagram illustrating multi-layer FEC.

FIG. 3 is a diagram illustrating multi-layer FEC in which various layers can use FEC from different layers. In particular, the current subject matter extends the use of FEC at multiple layers to help recover error at different OSI layers and significantly reduce bit errors and data loss in the communication systems. At each layer, an appropriate FEC algorithm can be chosen in association or in relation to other layer FEC to minimize communication system level data loss due to jamming. Such a multi-layer FEC approach for jamming provides enhanced recovery or resiliency in communication systems.

Figure 4:
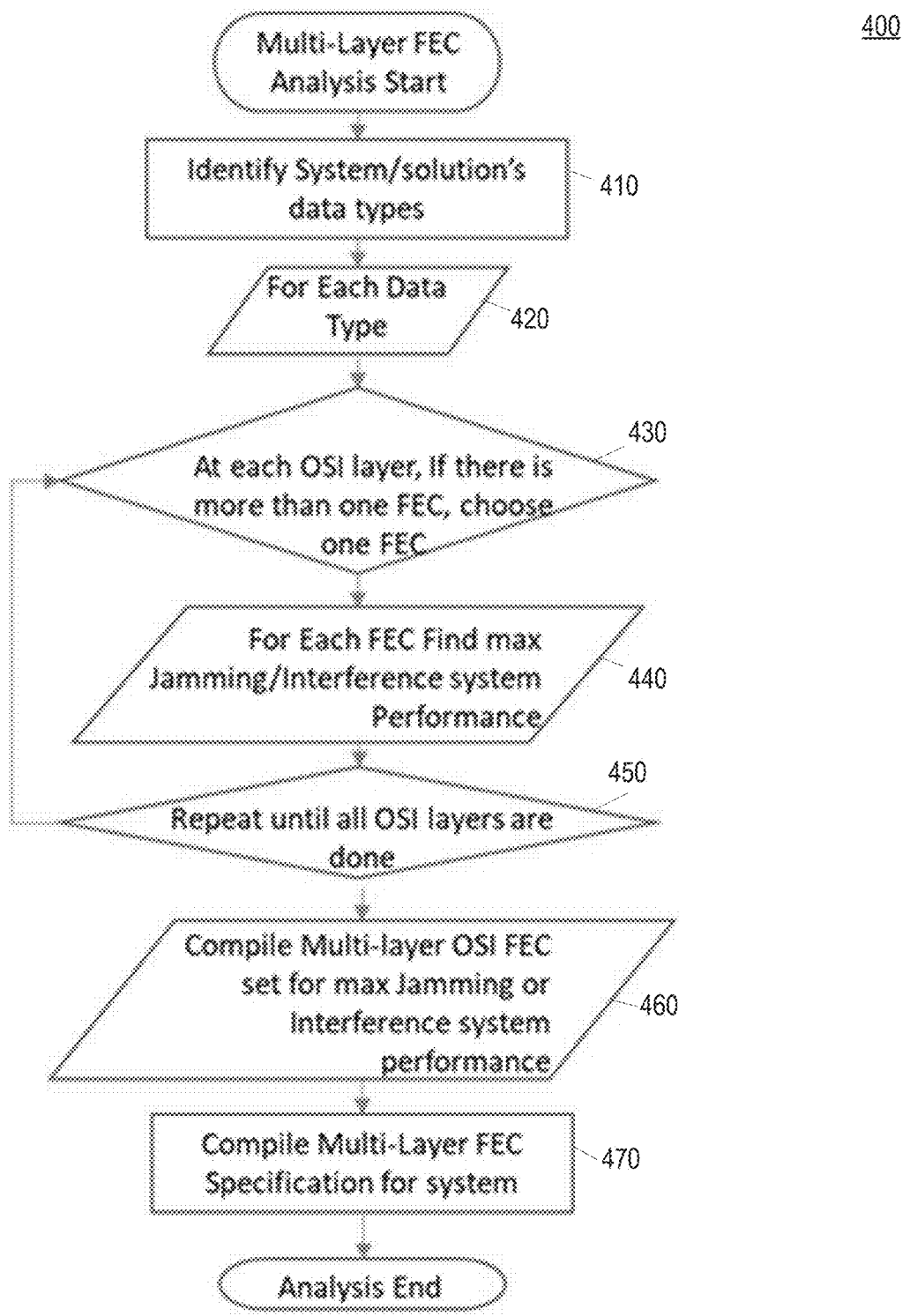
FIG. 4 is a process flow diagram illustrating the compilation of a multi-layer FEC specification.

FEC specific data sheets characterizing products under normal conditions is not sufficient for addressing jamming conditions which can significantly change the characteristics. Therefore, as provided herein, jamming-specific data sheets can be developed for each product. Communication systems or solutions, which are resilient to jamming, need to publish (or otherwise make available) different combinations of multi-layer FEC specifications in reducing the BER for various jamming conditions. The multi-layer FEC specifications can be generated as provided in diagram 400 of FIG. 4. The process can start, at 410, by identifying the data types for the communication system or corresponding solution. This can be accomplished by identifying audio, video streaming, and Internet/Intranet data applications. The applications can be separated using flows or class of service (COS) or Differentiated Services Code Point (DSCP). Thereafter, at 420, for each identified data type, at 430, one FEC is chosen at each layer (if there are multiple FECs). For example, in the case of SD-WAN, different flow or COS traffic can be assigned with different FEC methods. At the application layer by applying WAN optimization for specific COS or application flow traffic, associated FEC can be applied. In addition, for each FEC, at 440, the performance of the communication system or corresponding solution under maximum jamming/interference can be determined. This iterative process can be repeated, at 450, until all OSI layers are characterized. The resulting information can be compiled, at 460, to result in a multi-layer OSI FEC set that characterizes performance during maximum jamming or interference. This set can then be used, at 470, to generate the anti-jamming data specification for the communication system or solution.

Anti-jamming system performance can be optimized on a system by system basis for different parameters such as throughput, SLA, BER, power with respect to anti-jamming. During design time, for each jamming type, a spectrum can be captured using a spectrum analyzer (e.g., RSA500A Series Portable Spectrum Analyzer, etc.). In addition for each layer (e.g., OSI layer, etc.), specific jamming data sheets and graphs can be generated for the corresponding jamming type. Further, policies (i.e., rules, etc.) for optimizing different parameters can be generated for each jamming type and for each layer. For each combination of multi-layer sets, jamming data sheets and graphs can then be generated for each jamming type. Further, policies can be generated for optimizing different parameters for the jamming type and for the corresponding multi-layer set. The resulting jamming data sheets and graphs can then be published or otherwise made available as anti-jamming data specifications.

Figure 5:
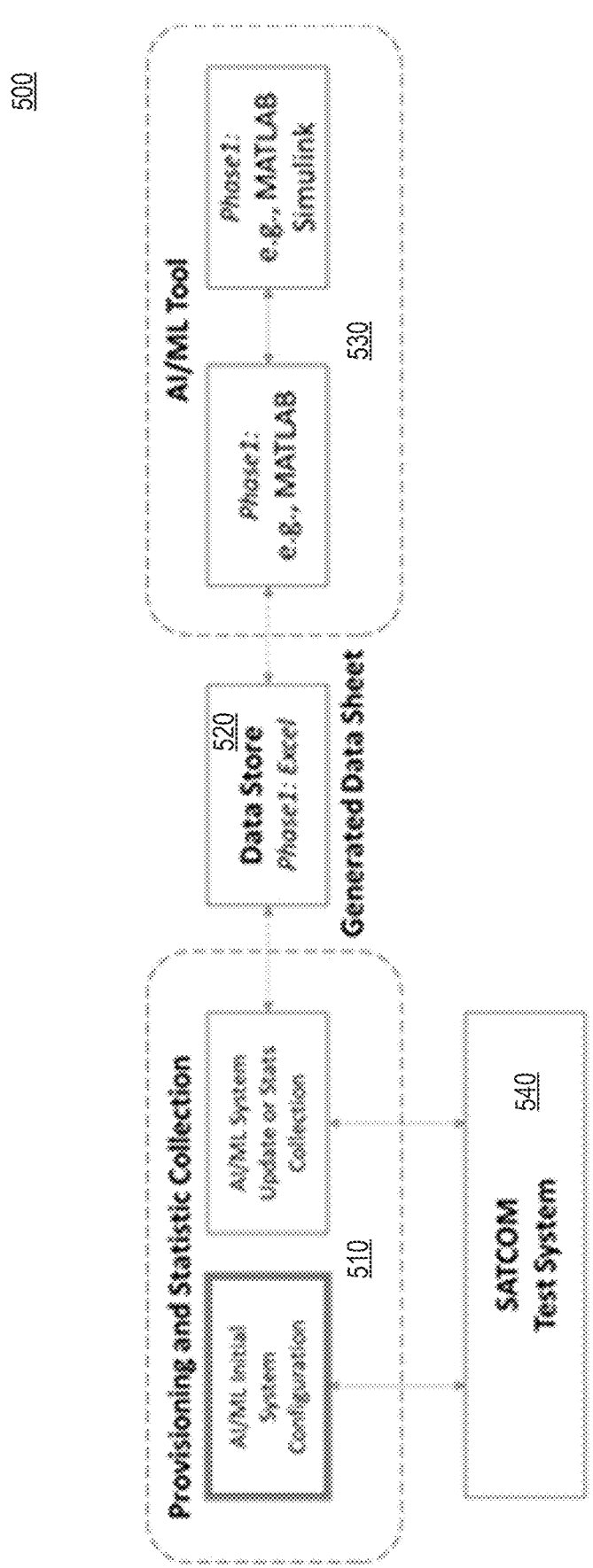
FIG. 5 is a diagram illustrating an artificial intelligence-based technique for selecting an appropriate mitigation solution for jamming/interference.

In some variations, as provided in diagram 500 of FIG. 5, artificial intelligence (AI) models (e.g., machine learning models, etc.) can be used to identify the jamming type using spectrum capture and optimize different parameters such as throughput, SLA, BER, power with respect to anti-jamming. These AI models can, in some variations, be executed locally on the communication system while, in other variations, these AI models can be generated during design of the communication system so that the appropriate anti-jamming configuration, including FEC configuration, can be employed when needed. A provisioning and static collection system 520 can utilize data obtained from a test system 540 (e.g., a SATCOM system, etc.) which can include system configuration information and any modifications as suggested using AI. An AI/ML tool 530 can execute one or more machine learning or other AI models on data stored in a data store 520 to result in data sheets (using techniques such as those described above). The data store 520 allows for the ability to change the AI/ML tools, algorithms, and tuning.

Figure 6:
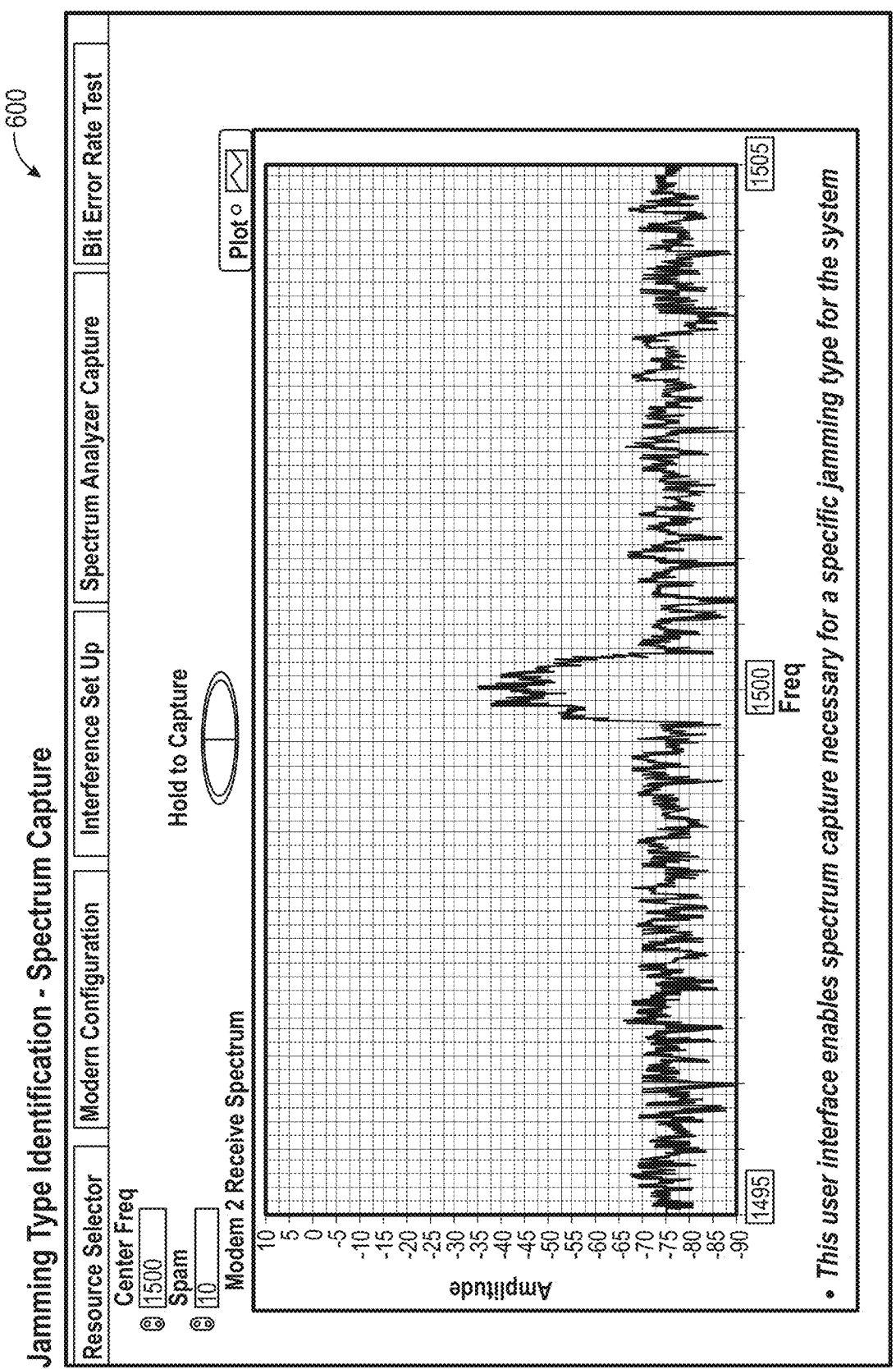
FIG. 6 is a diagram illustrating a sample image of a captured frequency spectrum.

As noted above, a spectrum can be captured which characterizes each jamming type. FIG. 6 is a diagram 600 illustrating a sample spectrum capture and tool for identifying jamming type. As noted above, each jamming type may require a different mitigation solution or solutions. Therefore, a spectrum capture can be used to identify the jamming type and/or the interference mitigation solution using, in some examples, an AI/ML tool.

The layer 3 FEC method provides capability to enable FEC on each flow level (i.e., traffic for a particular application between a source and destination). This arrangement allows flow level prioritization and enables different FEC types for different priority traffic flows. In the current modems, at the physical modem level, only one FEC method can be enabled for each modem interface. Traffic flow prioritization and associated FEC is not possible at layer 1. For example, when ½ rate FEC is enabled, the traffic is doubled, and throughput performance of the system goes down. In the case of layer 3 (e.g., SD-WAN), if ½ rate FEC is enabled only for higher priority traffic flow, then the throughput of the system could be increased significantly by enabling new adaptive rate FEC for low priority traffic flows.

The system can provide for parameter provisioning and other updates. For example, the system can be configured to allow modem specific modulation types, FEC types, rates, effective EbNo values, and modem power levels within acceptable ranges.

Once the necessary system of system provisioning is done, the data sheet and graph can be generated to be published or otherwise made available as an anti-jamming data specification. For example, to generate a modem's jamming related data sheets and graphs, first the necessary modem initial parameters are provisioned. Then noise and signal generators are adjusted to create each jamming type. For each jamming type, the spectrum capture captures the details necessary to identify the jamming type. For each modem's FEC type and rate, the modem power levels are adjusted gradually to change the EbNo values in steps. The BER is measured for each EbNo by sending the traffic during the jamming conditions. The system stores all the above generated data in the data store 520 specified in the AI/ML architecture. The modem data sheets, graphs, and spectrum are generated for publication from the data store 520 for a jamming related product specification. For a multi-layer product specification, the SOS jamming parameter provisioning is used to set different parameters (e.g., multi-layer FECs, SLAs, message lengths) and multi-layer product specifications are generated.

Figure 7:
FIG. 7 is a diagram illustrating a sample process for generating a multi-layer FEC specification.

FIG. 7 is a process flow diagram 700 illustrating the process of SATCOM modem system multi-layer FEC jamming specification generation. FEC effectiveness depends on each application data type. Therefore, a specification may need to be generated for a data type. For every critical application, FEC and rate jamming performance needs to be generated as shown in the left portion of FIG. 7. The right portion of FIG. 8 details each of the SATCOM modem jamming data specification generation iterations. Referring still to FIG. 7, at 704, a multi-layer FEC analysis is commenced. As part of this analysis, at 708, system and solution data types are identified. Next, at 712, for each data type, if there is more than one application level FEC option available, then an FEC is selected at 716 that is best suited for the environment. Next, at 720, for each FEC, maximum jamming/interference application performance can be found. An iterative process as shown in the right portion of FIG. 7 is performed, until all application layer FECs and rates have been completed. Thereafter, at 732, a multi-layer FEC specification can be generated which concludes the analysis 736.

Referring to the right hand portion of FIG. 7, at 740, the modem's jamming-data specification (J-DS) generation is commenced in which, at 744, one or more configuration settings or parameters of the modem can be adjusted such as, but not limited to, modulation, carrier frequency, FEC type and rate. In addition, the network master (NM) traffic can be set near the line rate with a bit error rate (BER) less than or equal to $10^{-9}$ (which can be considered a normal operating condition). Thereafter, at 748, with the automatic uplink power control on the modem being disabled, a jamming can be introduced in steps of BER of $10^{-1}$ so that the corresponding spectrum can be captured. Here, the effective BER and the effective traffic rate measured with the network master are stored automatically. Subsequently, at 752, transmission and reception settings can be set so that a normalized signal to noise ratio (e.g., EbNo) is equal to zero dB. Thereafter, at 756, if the modem carrier locked or link have status UP (which indicates that the SATCOM modem transport is operational), then the signal to noise ratio and BER are measured along with NM traffic rate or actual traffic rate and stored. Additionally, the signal to noise ratio (i.e., EbNo) can be incremented with the modem transmission or reception power levels and/or noise power level adjustments in generating the EbNo vs BER J-DS or generating the jamming condition operational data. If the signal to noise ratio is less than a threshold (e.g., 12 db), at 760, then the process iterates back to the operations in 756. If the signal to noise ratio is greater than the threshold, 764, then the (S/G) of EbNo vs. BER is stored along with BER and the effective traffic rate. The next modem FEC rate can then be initiated, at 768, with the process returning to operation 744 until such time that all rates have been characterized so that the modem's J-DS generation ends.

Figure 8:
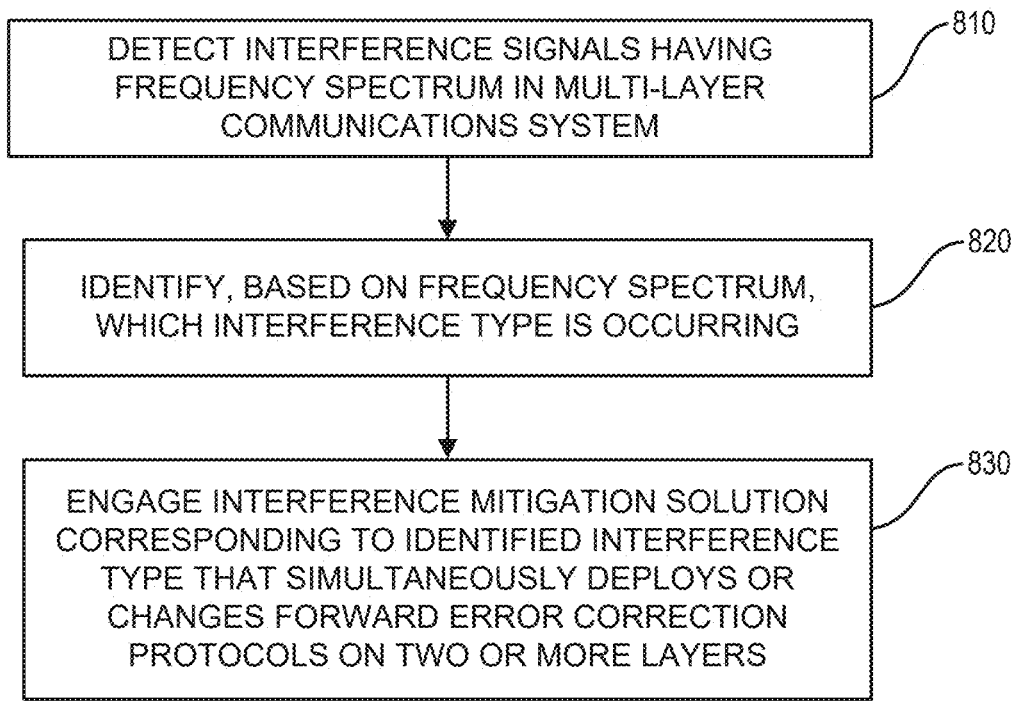
FIG. 8 is a process flow diagram illustrating a technique for multi-layer forward error correction (FEC) for jamming resiliency.

FIG. 8 is a process flow diagram 800 in which, at 810, interference signals are detected in a multi-layer communication system which have a frequency spectrum captured using a spectrum analyzer. Thereafter, at 820, an occurring interference type is identified based on image of the frequency spectrum. In response, at 830, an interference mitigation solution can be engaged which corresponds to the identified interference type, the interference mitigation solution simultaneously deploying or changing a configuration one or more forward error correction (FEC) protocols on each of two or more of the layers. If the interference mitigation solutions are not sufficient to counter the jamming, the captured spectrum can be used to shift the carrier frequency to a different range where there is no interference. Alternatively, different modulation can be used to lessen the jamming impact in combination with changing multi-layer FEC.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A method comprising:
   detecting jamming and/or interference signals having a frequency spectrum in a multi-layer communication system;
   identifying, based on an image of the frequency spectrum and a plurality of jamming specifications which characterize transmission and reception information and mitigation solutions, which of a plurality of interference types is occurring; and
   engaging an interference mitigation solution for the identified interference type as specified in the jamming specifications, the interference mitigation solution simultaneously deploying or changing a configuration of one or more forward error correction (FEC) on each of two or more of the layers.

2. The method of claim 1, wherein a first of the two or more layers in which the interference mitigation solution is employed comprises a network level layer.

3. The method of claim 2, wherein a second of the two or more layers in which the interference mitigation solution is employed comprises a physical level layer.

4. The method of claim 3, wherein a third of the two or more layers in which the interference mitigation solution is employed comprises an application level layer.

5. The method of claim 1, wherein the identifying is performed by at least one machine learning model using the frequency spectrum as an input.

6. The method of claim 5, wherein the at least one machine learning model comprises a machine learning-based image classifier.

7. The method of claim 6, wherein the image classifier comprises a convolutional neural network.

8. The method of claim 7 further comprising:
   training the machine learning-based image classifier with each of the plurality of jamming specifications which characterize transmission and reception information and mitigation solutions.

9. The method of claim 1, wherein the multi-layer communication system comprises a wireless communication system.

10. The method of claim 9, wherein the wireless communication system is selected from a group consisting of: a broadband cellular network, a short-range wireless technology, or a satellite communications network.

11. A system comprising:
    at least one data processor; and
    memory comprising instructions, which when executed by the at least one data processor, result in operations comprising:
      receiving data characterizing detected jamming and/or interference signals having a frequency spectrum in a multi-layer communication system;
      identifying, based on an image of the frequency spectrum and using a plurality of jamming specifications which characterize transmission and reception information and mitigation solutions, which of a plurality of interference types is occurring; and
      engaging an interference mitigation solution for the identified interference type as specified in the jamming specifications, the interference mitigation solution simultaneously deploying or changing a configuration of one or more forward error correction (FEC) on each of two or more of the layers.

12. The system of claim 11, wherein a first of the two or more layers in which the interference mitigation solution is employed comprises a network level layer.

13. The system of claim 12, wherein a second of the two or more layers in which the interference mitigation solution is employed comprises a physical level layer.

14. The system of claim 13, wherein a third of the two or more layers in which the interference mitigation solution is employed comprises an application level layer.

15. The system of claim 11, wherein the identifying is performed by at least one machine learning model using the frequency spectrum as an input.

16. The system of claim 15, wherein the at least one machine learning model comprises a machine learning-based image classifier.

17. The system of claim 16, wherein the image classifier comprises a convolutional neural network.

18. The system of claim 16, wherein the operations further comprise:
training the machine learning-based image classifier with each of the plurality of jamming specifications which characterize transmission and reception information and mitigation solutions.

19. The system of claim 11, wherein the multi-layer communication system comprises a wireless communication system.

20. The system of claim 19, wherein the wireless communication system is selected from a group consisting of: a broadband cellular network, a short-range wireless technology, or a satellite communications network.

21. A method comprising:
receiving data characterizing detected jamming and/or interference signals having a frequency spectrum in a multi-layer wireless communication system;
identifying, based on an image of the frequency spectrum and using at least one machine learning model, which of a plurality of interference types is occurring; and
engaging an interference mitigation solution corresponding to the identified interference type, the interference mitigation solution simultaneously deploying or changing a configuration of one or more forward error correction (FEC) on each of two or more of the layers.

22. The method of claim 21, wherein the machine learning model comprises a convolutional neural network trained using each of a plurality of jamming specifications which characterize transmission and reception information and mitigation solutions.

* * * * *